United States Patent
Gulick

[11] 3,794,069
[45] Feb. 26, 1974

[54] LINE BREAK CONTROL
[75] Inventor: Ronald A. Gulick, Houston, Tex.
[73] Assignee: Research Engineering Company, Houston, Tex.
[22] Filed: Nov. 20, 1972
[21] Appl. No.: 308,026

[52] U.S. Cl. .............................. 137/486, 137/599
[51] Int. Cl. ............................................ F16k 17/20
[58] Field of Search ............ 137/599, 486, 494, 460

[56] References Cited
UNITED STATES PATENTS
| | | | |
|---|---|---|---|
| 2,849,987 | 9/1958 | Shafer | 137/460 X |
| 3,089,512 | 5/1963 | Julien | 137/460 |
| 3,612,081 | 10/1971 | Williams | 137/460 X |
| 2,589,373 | 3/1952 | Hammock | 137/599 |
| 1,220,979 | 3/1917 | Gregory | 137/599 |
| 3,118,472 | 1/1964 | Buie | 251/208 X |
| 2,072,314 | 3/1937 | Rhodes | 137/460 |

Primary Examiner—Harold W. Weakley

[57] ABSTRACT

This invention is directed to a system for detecting pressure drops in a flow line, the same being indicative of a line break. Reduced pressure is communicated to one side of a diaphragm. A similar reduction is communicated much more slowly to the other side by virtue of series connected oil reservoirs having an orifice therebetween. The pressure differential on opposite diaphragm sides causes valve closure.

5 Claims, 2 Drawing Figures

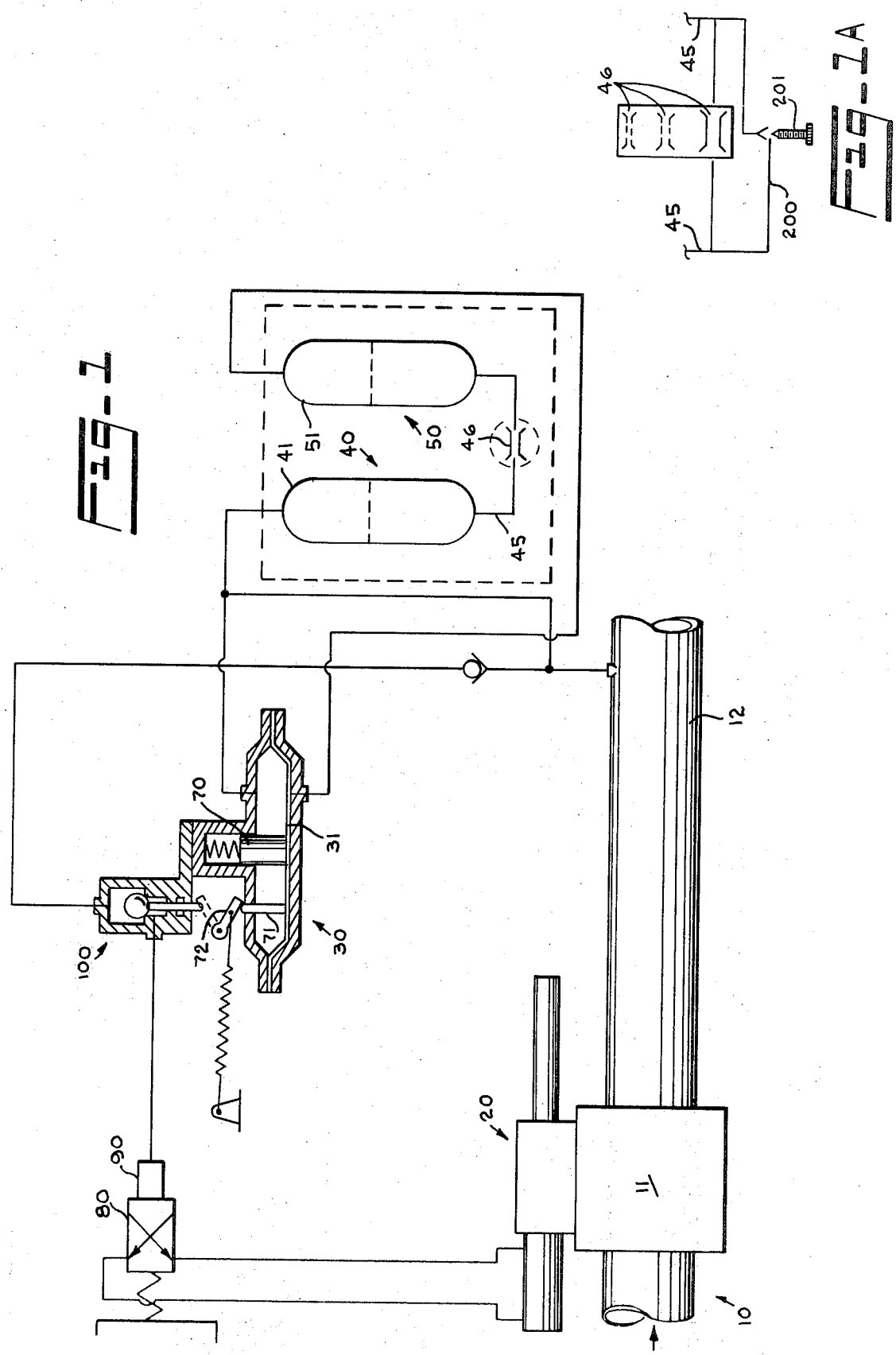

LINE BREAK CONTROL

BACKGROUND OF THE INVENTION

Whenever material is caused to flow through a pipe line, there is concern with line breakage, which disrupts service and loses material. Prior systems have positioned spaced valves throughout the line for effecting material cutoff, in the event of a break. Valve control has been manually, as well as automatically actuatable by pneumatic or hydraulic means. Some prior systems have utilized pressure differentials, transmitted to opposite sides of a diaphragm, to cause valve actuation, thereby shutting down the line. One of the means heretofore suggested as a means for causing such pressure differential has been the positioning of an orifice in a gas or other fluid passing system. Gas would enter one diaphragm chamber without passing through the orifice, and the other only after passing through the orifice. Naturally, if the gas is line gas or line gas controlled, then when a break occurs, the line pressure would drop. This was almost immediately communicated to one diaphragm chamber. However because of the orifice limitation, the drop would be communicated such more slowly to the other side, resulting in a pressure differential. While this system was effective when operative, limitation became apparent. Such gas controlled systems contained contaminants. A prime difficulty encountered was the build-up of such contaminants around and in the orifice. This has made regulation difficult, and resulted in periodic shutdowns for maintenance or parts replacement. This is the problem area to which this invention is directed.

SUMMARY OF THE INVENTION

A diaphragm permits an actuator to open or close a valve, which valve is positioned in a line. The downstream line pressure is communicated directly to one side of the diaphragm. Thus, on a break occurring a pressure drop will be so communicated. This same downstream line pressure is communicated to one of a pair of oil reservoirs, they being series connected by virtue of an orifice containing conduit. On a pressure drop occurring, the tendency of the connected reservoirs to equalize pressure will cause oil flow through the connecting conduit. The orifice will, however, restrict movement, and therefore slow down the pressure change. Since one side of a reservoir is in pressure communication with the opposite diaphragm side from that initially described, it is seen that a pressure imbalance will be created, causing the actuator to close the valve.

DESCRIPTION OF THE DRAWINGS

FIG. 1 is a schematic representation of the system comprising this invention, and FIG. 1A is a detail of the orifice shown within the phantom lines of FIG. 1.

DESCRIPTION OF A PREFERRED EMBODIMENT

The drawings indicate a conduit, representing a pipeline, at 10. The passage or flow of fluids or material through this line, in the direction of the arrow, is regulated by valve 11, which may be one of a number of valve types. The opening or closing of valve 11 would be controlled by a valve actuator, generally illustrated at 20. Such actuators, being common in the art, need not be described fully herein, one type being illustrated in U.S. Pat. No. 3,640,140.

The downstream end 12 of line 10 is pressure connected to the valve actuator by the structure described hereinbelow.

End 12 is linked to one side of diaphragm chamber 30, the diaphragm being illustrated at 31. The same end 12 is also connected to the upper portion 41 of pressure vessel 40. This vessel comprises part of the significant improvement of this invention. Such improvement is generally enclosed within the dashed line area. The lower end of vessel 40 communicates with the lower end of a similar vessel 50, by virtue of a conduit 45, said conduit containing an orifice device 46, which restricts passage of fluid through such conduit. The upper end 51 of vessel 50 is connected by a conduit to diaphragm chamber 30, opposite the juncture of the conduit leading from portions 41 of vessel 40. Oil, or similar viscous and relatively inert fluid fills approximately the lower one-half of each vessels 40,50, to the dashed level indicated. Line gas would fill the top portion of vessel 40. Some other available gas, such as N2 may be used within the system comprising the upper portion of vessel 50, the lower portion of the diaphragm chamber, and the conduit connection therebetween. Upward movement of the diaphragm would have to overcome the biasing means depicted by spring-block 70. In the event of such upward movement, a snap action control system would become activated. This control system, while variable, might comprise an activator lug 71 movable with the diaphragm, and spring-biased lever arm 72, which on being displaced beyond an approximate mid position would quickly move or pivot to a further position. On such pivoting occurring, the valve system schematically illustrated at 80 which connects an outside source of power (not shown) such as air under pressure, to actuator 20, would connect such source so as to cause the actuator to close the valve. The valve system may be controlled by a solenoid 90 which in turn would be under the control of a ball check valve system such as indicated at 100. It may be repeated that for purposes of this invention, the system for translating diaphragm movement into actuator control of valve 11, may be varied.

The operation would be as follows. Normally, valve 11 would be open, material would be flowing through line 12, and the pressure would be evenly balanced within diaphragm chamber 30 on opposite sides of the diaphragm. If a break occurs downstream of valve 11, the pressure would automatically drop. This drop would almost immediately be communicated to the chamber 30 above the diaphragm, as well as to pressure vessel 40, above the oil level. Since orifice 46 acts to restrict the flow of material from one vessel to the other, the pressure within vessel 50 remains high, until the fluid gradually bleeds through the orifice. Thus, during this initial period, due to the conduit joining vessel 50 and the underside of chamber 30, such underside is under a higher pressure than above. This would cause upward diaphragm movement, along with attached lug 71, and thereby cause lever 72 to pivot upwardly. Such pivoting would open the ball of check valve 100, so as to actuate solenoid 90, and thereby so connect the outside power source to actuator 20 as to cause valve 11 to close. It may be noted that the drawing illustrates a connection between the downstream side 12 of line 10 and ball valve 100. On a break occurring, downward pressure on the ball of valve 100 would be reduced, thereby easing the force that would otherwise resist the snap action of lever 72.

The detail of FIG. 1A, illustrates the adjustability of the orifice feature. A disc, roll or similar structural member may include a number of passage orifices, so that on movement, much like a valve element, orifices of different sizes may be chosen and positioned on line. A number of such orifices 46 are indicated in FIG. 1A. A further adjustable feature would include the provision of a conduit 200, having a needle valve adjustment 201, therein, all being in parallel to conduit 45. This would permit fluid moving from one of vessels 40 or 50, to the other, to at least partially bypass or shunt the orifice. Thus, at least 2° of regulation are provided, which provide the sensitive controls desired.

While only limited embodiments have been described, certain modifications might be made without departing from the spirit of the invention, the scope of which is intended to be limited only by the following appended claims.

I claim:

1. A system for controlling a line break in a product line, comprising:
   A. diaphragm housing including chambers on opposite sides of a diaphragm;
   B. first means for pressure communication between a product line and one of said diaphragm chambers; and
   C. means for causing a pressure imbalance between said chambers on a break occurring in said line, said imbalance causing means including:
      1. time delay means for delaying pressure communication between said product line and the other of said diaphragm chambers, said time delay means including:
         a. a pair of spaced vessels intermediate said product line and said other diaphragm chamber,
         b. said vessels being adapted to have relatively inert liquid filling a substantial portion of said vessels,
         c. first conduit means connecting the liquid-containing portions of said vessels, and
         d. orifice means positioned in said first conduit means,
      2. second conduit means communicating between said product line and the non-liquid containing portion of one of said vessels, and
      3. third conduit means communicating between said other of said diaphragm chambers and the non-liquid containing portion of the other of said vessels.

2. The system of claim 1 wherein each of said vessels has a portion adapted to receive other fluid other than said relatively inert liquid, said other fluid being isolated from said orifice means.

3. The system of claim 1, wherein said orifice means includes means for selectively positioning, in said first conduit means, a plurality of differently sized orifices.

4. The system of claim 1, wherein said first conduit means includes a line parallel to said orifice means, said parallel line having therein means for adjustably controlling liquid flow through said parallel line.

5. The system of claim 1 wherein said first conduit means includes a) means for selectively positioning therein one of a plurality of differently sized orifices, and b) a further liquid passing line parallel to said orifice means, said parallel line having therein means for adjustably controlling liquid flow through said parallel line.

* * * * *